United States Patent
Hannan

(10) Patent No.: US 6,563,322 B1
(45) Date of Patent: May 13, 2003

(54) METHOD AND APPARATUS FOR DETECTING OPEN CIRCUIT FAULT CONDITION IN A COMMON-MODE SIGNAL

(75) Inventor: Douglas Michael Hannan, Cumberland, ME (US)

(73) Assignee: National Semiconductor Corporation, Santa Clara, CA (US)

( * ) Notice: Subject to any disclaimer, the term of this patent is extended or adjusted under 35 U.S.C. 154(b) by 113 days.

(21) Appl. No.: 09/935,561

(22) Filed: Aug. 22, 2001

(51) Int. Cl.[7] .................. G01R 31/08; G01R 31/14; H01H 31/02; H03K 19/013; H03K 17/16
(52) U.S. Cl. .................. 324/522; 324/511; 324/539; 324/531; 326/14; 326/30
(58) Field of Search ................. 324/531, 511, 324/606, 607, 622, 522, 539; 326/86, 14, 30; 178/69 G; 714/716; 327/65

(56) References Cited

U.S. PATENT DOCUMENTS

| | | | | |
|---|---|---|---|---|
| 3,288,929 A | * | 11/1966 | Hutchinson | 178/69 G |
| 3,825,682 A | * | 7/1974 | Phillips | 178/69 G |
| 4,178,582 A | * | 12/1979 | Richman | 714/716 |
| 4,782,300 A | * | 11/1988 | Bonaccio et al. | 324/509 |
| 5,374,861 A | * | 12/1994 | Kubista | 326/30 |
| 5,488,306 A | * | 1/1996 | Bonaccio | 324/539 |
| 6,124,727 A | * | 9/2000 | Bridgewater, Jr. et al. | 326/33 |
| 6,130,795 A | * | 10/2000 | Freitas et al. | 360/67 |
| 6,288,577 B1 | * | 9/2001 | Wong | 327/65 |
| 6,486,695 B1 | * | 11/2002 | Nakagawara | 326/14 |

* cited by examiner

Primary Examiner—N. Le
Assistant Examiner—Wasseem H. Hamdan
(74) Attorney, Agent, or Firm—Merchant & Gould; John W. Branch

(57) ABSTRACT

The present invention relates to an apparatus and a method for detecting an open circuit fault condition in a differential signal, and generating a fault detection signal. An open circuit fault condition is detected by employing weak current sources to pull the differential signal paths outside the valid ac common-mode range and toward the supply rails. If both signal paths can be pulled within a predetermined proximity to the supply rails by their respective weak current sources, an open condition fault is defined to exist and a fault detection signal is generated. The fault detection signal can be used by another device to report the fault condition.

11 Claims, 12 Drawing Sheets

METHOD AND APPARATUS FOR DETECTING OPEN CIRCUIT FAULT CONDITION IN A COMMON-MODE SIGNAL

FIELD OF THE INVENTION

The present invention relates to an apparatus and a method for detecting an open circuit fault condition in a common-mode differential signal. A fault detection signal is generated for use by another device to report the fault condition.

BACKGROUND OF THE INVENTION

Differential signaling has been in existence for many years. For example, teletypes were some of the first equipment to use differential signaling to communicate. One common differential signaling technique utilizes a current loop to send and receive information between a receiver and transmitter.

According to this differential signaling technique, information is represented by current sent in one direction around the loop, or the other direction around the loop. A pulse of current in the loop in one direction may correspond to a logic value of "1", while a pulse in the opposite direction may correspond to a logic value of "0."

Current loops have several advantages over other signaling techniques. For example, data sent utilizing a current loop can travel further than data sent through a common RS-232 interfaces. Current loop differential signaling techniques also provide protection against electrical interference. Additionally, current loop differential signaling techniques can reliably make connections when other communication techniques cannot.

One type of a current loop differential signaling technique is Low Voltage Differential Signaling (LVDS). LVDS is a differential signaling technique commonly used in data transmission systems. LVDS uses relatively low supply voltages; $V_{DD}$ is generally in the range of 2.5 volts and $V_{SS}$ is generally zero. The valid common-mode range for a LVDS receiver is generally between $V_{SS}$+50 mV and $V_{DD}$−50 mV. A low voltage differential signal produced by a line driver typically has peak-to-peak amplitudes in the range from 250 mV to 450 mV. The low voltage swing minimizes power dissipation, while maintaining high transmission speeds. Typical transmission speeds are over 100 Mbps (Mega-bits per second).

SUMMARY OF THE INVENTION

The present invention is directed to detecting an open circuit fault condition in a differential signal. More specifically, the present invention is directed to providing an apparatus and a method for detecting when a differential signal is floating outside the valid common-mode range, and generating an open circuit fault detection signal. An open circuit fault condition prevents a valid differential signal from being obtained.

Briefly stated, the invention detects the existence of an open circuit fault condition by employing weak current sources to pull the two portions of the differential signal in opposite directions. The invention is also buffered from the differential signal source. Buffered signals are produced in response to the pulled differential signal. Portions of the buffered signal are compared to reference signals. Open circuit fault condition signals are produced when the amplitude difference between portions of the buffered signal and the reference signals meet predetermined criteria. An open circuit fault detection signal is produced from a comparison of open circuit fault condition signals. The open circuit fault detection signal is available to other devices to communicate the existence of an open circuit.

According to another example of the invention, the fault detection occurs with loading, altering, and disturbing the differential signal source.

According to yet another example of the invention, the reference signals are a predetermined amplitude toward the DC common-mode voltage of the differential signal from the local power supply rails.

According to a further example of the invention, the presence of an open circuit fault condition is signaled by a high control signal.

A more complete appreciation of the present invention and its improvements can be obtained by reference to the accompanying drawings, which are briefly summarized below, to the following detail description of presently a preferred embodiment of the invention, and to the appended claims.

DETAILED DESCRIPTION OF THE PREFERRED EMBODIMENT

Figure 1:
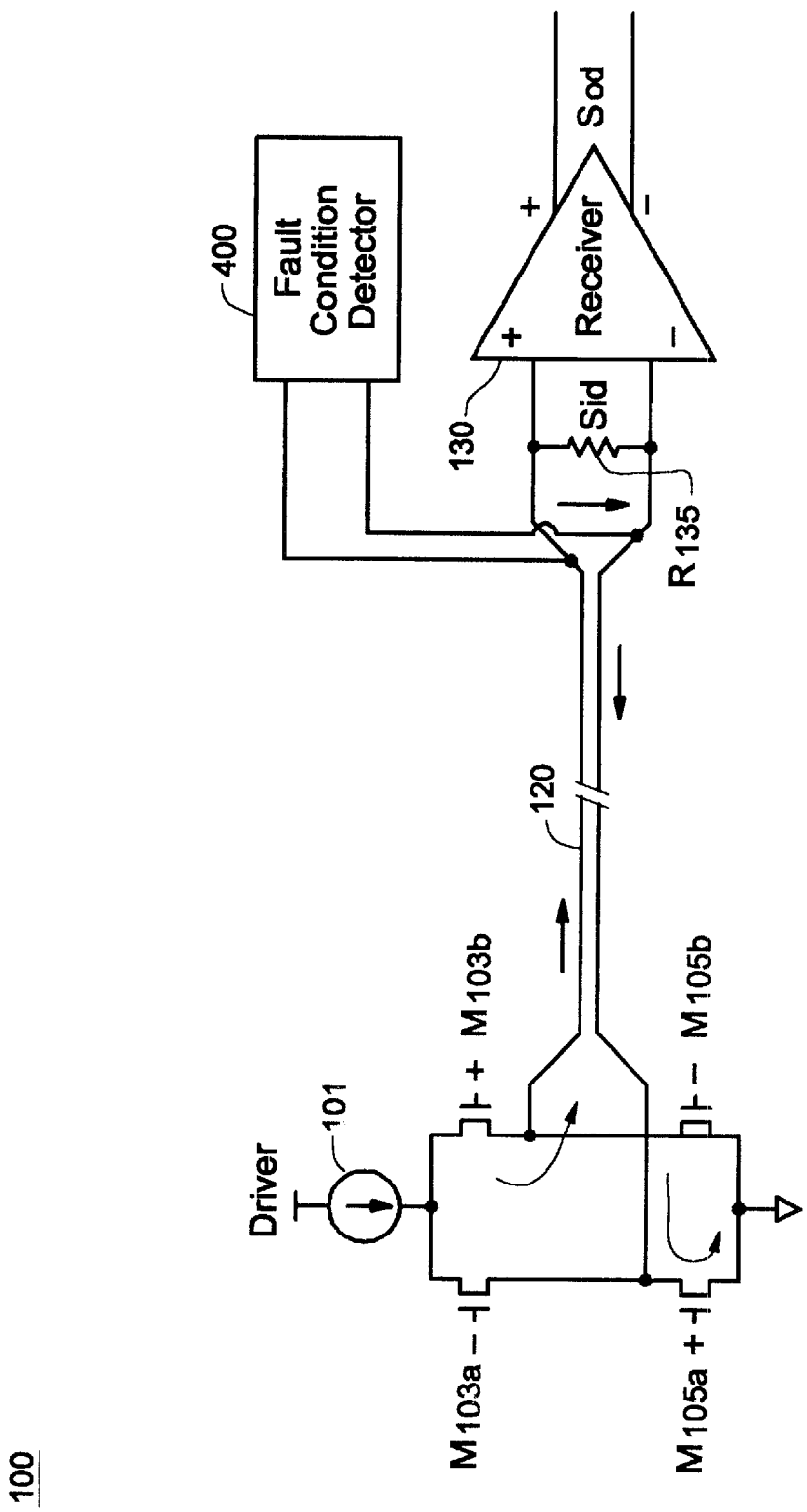
FIG. 1 illustrates a LVDS driver and receiver.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Definitions

Throughout the specification and claims, the following terms take the meanings explicitly associated herein, unless the context clearly dictates otherwise. The term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an," and "the" include plural references. The meaning of "in" includes "in" and "on."

Unless otherwise indicated, the type of transistors is generally not designated in the drawings, specifications, and claims herein. For the purposes of this invention, p-type and/or n-type transistors may be used unless expressly indicated otherwise. The transistors may be bipolar devices, MOS devices, GaAsFET devices, JFET devices, as well as one or more components that are arranged to provide the function of transistors.

Referring to the drawings, like numbers indicate like parts throughout the views. Additionally, a reference to the singular includes a reference to the plural unless otherwise stated or is inconsistent with the disclosure herein.

Overview

Under certain conditions, a LVDS device may experience a fault condition where its signal path is open, shorted, or terminated by abnormal means. A fault condition is produced when the differential signal is floating, or when the signal's peak-to-peak signal swing is very low or near zero (i.e., a short circuit AC condition.). When the signal path is open, the received signal may migrate to the supply voltages, or remain within the valid common-mode range. Any fault condition prevents a valid signal from being received by the receiver. As a result, the output signal of the device is unknown and undeterminable. This situation is not desirable.

Briefly described, the present invention detects an open circuit condition fault where the signal is outside the valid common-mode range. The fault is detected without loading or shifting a valid LVDS differential signal. A fault detection signal is provided for use by other circuits to report an open circuit condition. This invention does not address detecting other forms of differential signaling fault conditions.

As used herein, the terms "fault" and "fault condition" include the situation when the path in a differential signaling device is open and the differential signal is outside the valid common-mode range. The term "normal condition" means those situations not included within "fault condition." A "normal condition" is where the signal remains within the valid common-mode range, such as regular operating conditions when the differential signal is valid, and other conditions when the signal remains inside the common-mode range but is otherwise invalid.

The operating environment for the open circuit fault detector will be described below with reference to FIGS. 1 and 3.

Illustrative Environment

FIG. 1 is an exemplary schematic diagram illustrating a LVDS driver and receiver system being monitored by a LVDS open circuit fault condition detector. The system includes driver 101, receiver 130, differential communication line pair 120, load $R_{135}$, and open circuit fault condition detector 400.

Driver 101 includes a current source and two pairs of transistors, $M_{103b}$ and $M_{105a}$ driving current in one direction, and $M_{103a}$ and $M_{105b}$ driving current in the opposite direction. A typical current produced by driver 101 could be in the range of 4.0 mA. Differential line pair 120 couples driver 101 to receiver 130. Receiver 130 has high input impedance and can be any device configured to accept a LVDS input. Load $R_{135}$ is a termination load that is connected across the LVDS inputs of receiver 130, and can be in the range of 100 ohms. Receiver 130 detects a voltage signal that is driven across load $R_{135}$. When driver 101 switches directions, the current flow changes direction across $R_{135}$, and the signal across $R_{135}$ changes polarity. Receiver 130 detects the change in polarity as a "high" or "low" logic state (i.e., logic "1" or logic "0."

In operation, open circuit fault condition detector 400 monitors the differential signal $(S_{id})$ input to receiver 130 without significantly loading it.

Figure 2:
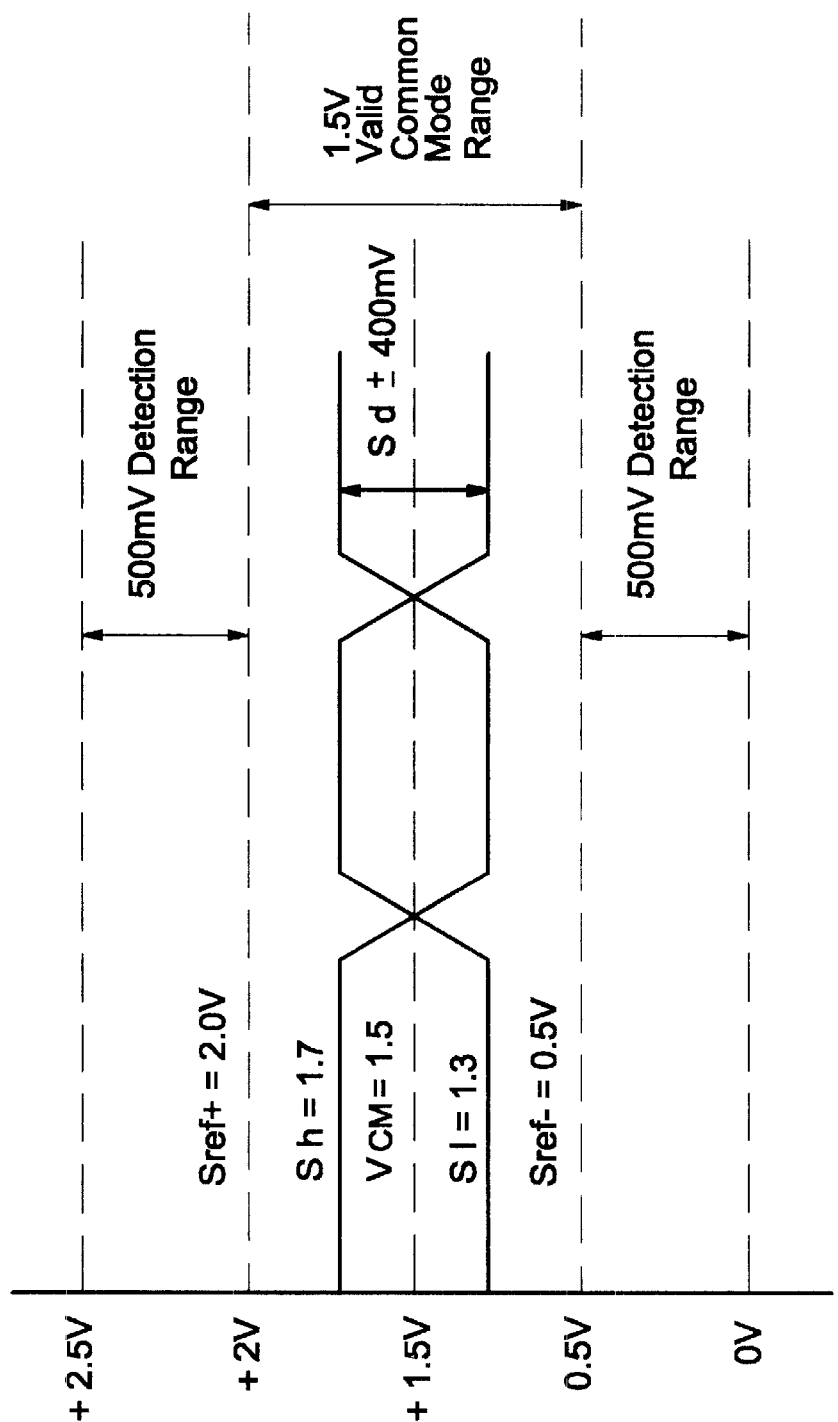
FIG. 2 is a graph illustrating LVDS signal swing and reference signals.

FIG. 2 illustrates a typical LVDS signal swing that may appear across load $R_{135}$ at the input terminals of receiver 130 illustrated in FIG. 1. For example, driving 4.0 mA through $R_{135}$ will produce a 400 mV input differential signal $(S_{id})$ across the input terminals of receiver 130 in FIG. 1. A typical LVDS system may have a common-mode voltage $(V_{CM})$ between +0.2V and +2.2V. As shown in FIG. 2, a typical LVDS signal may have a common-mode DC voltage $(V_{CM})$ centered at 1.5 V, a high output signal level $(S_h)$ at 1.7V, and low signal output level $(S_l)$ at 1.3V, yielding a differential signal $(S_d)$ with a 400 mV peak-to-peak.

In the present invention, a fault condition is determined to occur when the input differential signal $S_d$ (or $S_{id}$ of FIG. 1) is outside the valid common-mode range. An embodiment of the present invention establishes detection ranges lying outside the valid common-mode signal range. Reference signals (Sref+, Sref−) define the detection ranges.

Figure 3:
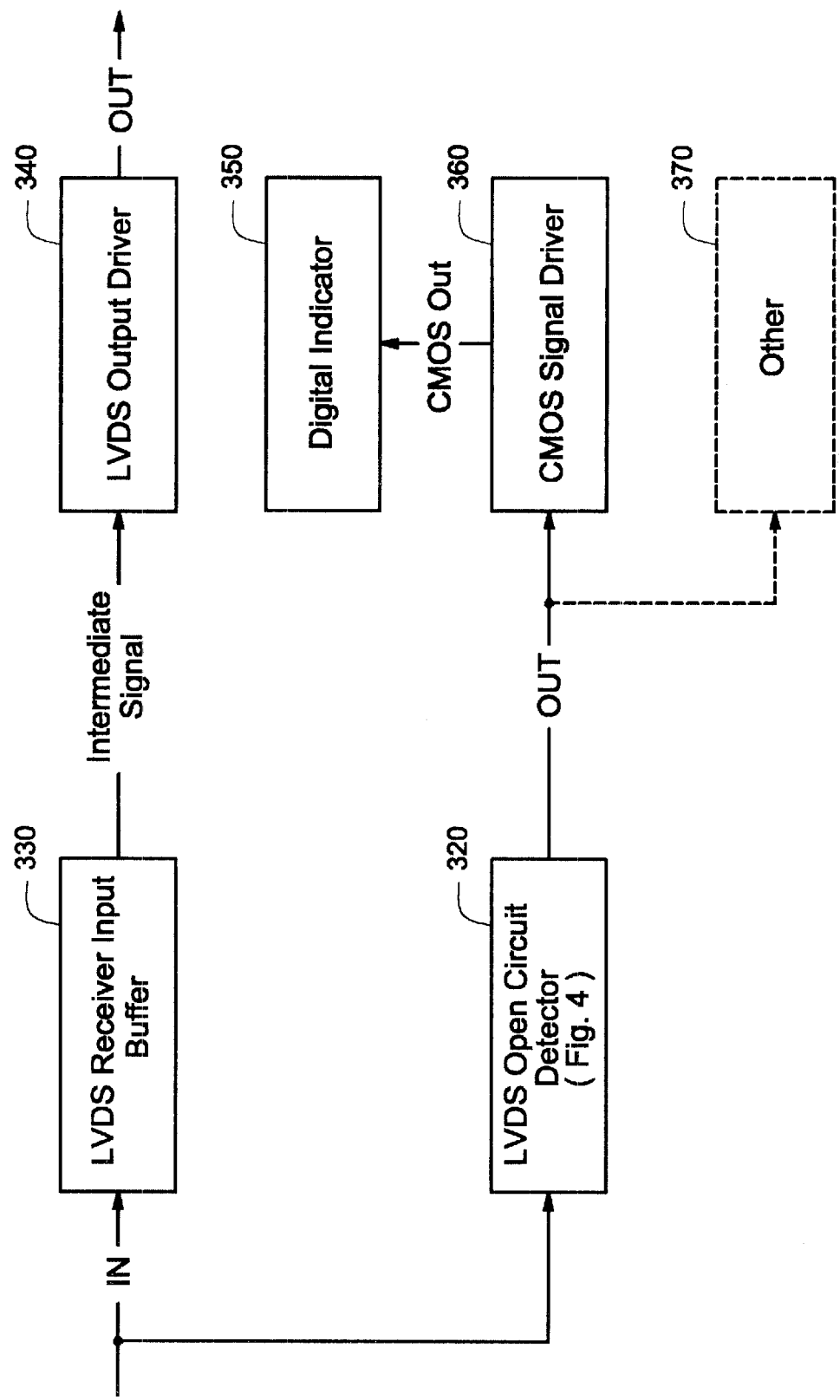
FIG. 3 is a block diagram illustrating an exemplary operating environment.

FIG. 3 is a block diagram illustrating an exemplary operating environment for a LVDS open circuit fault condition detector. A typical operating environment can include the LVDS receiver input buffer 330 (a component of LVDS receiver 130, FIG. 1), open circuit fault condition detector 320, output driver 340 (a component of LVDS receiver 130), and alternative output receivers including digital indicator 350, CMOS signal driver 360, and other devices 370.

LVDS open circuit fault condition detector 320 and LVDS receiver input buffer 330 are coupled in parallel to the differential signal (IN). LVDS receiver input buffer outputs Intermediate signal. LVDS open circuit detector outputs signal OUT. Output driver 340 receives signal Intermediate and outputs signal Out. CMOS signal driver receives signal OUT and outputs signal CMOS Out. Digital Indicator receives signal CMOS Out and outputs a report. Other 370 is an alternative output circuit for receiving signal OUT and providing a signal to other circuits or devices.

The disclosures related to FIGS. 5–11 provide a more detailed description of the operation of the LVDS open circuit fault condition detector.

Figure 4:
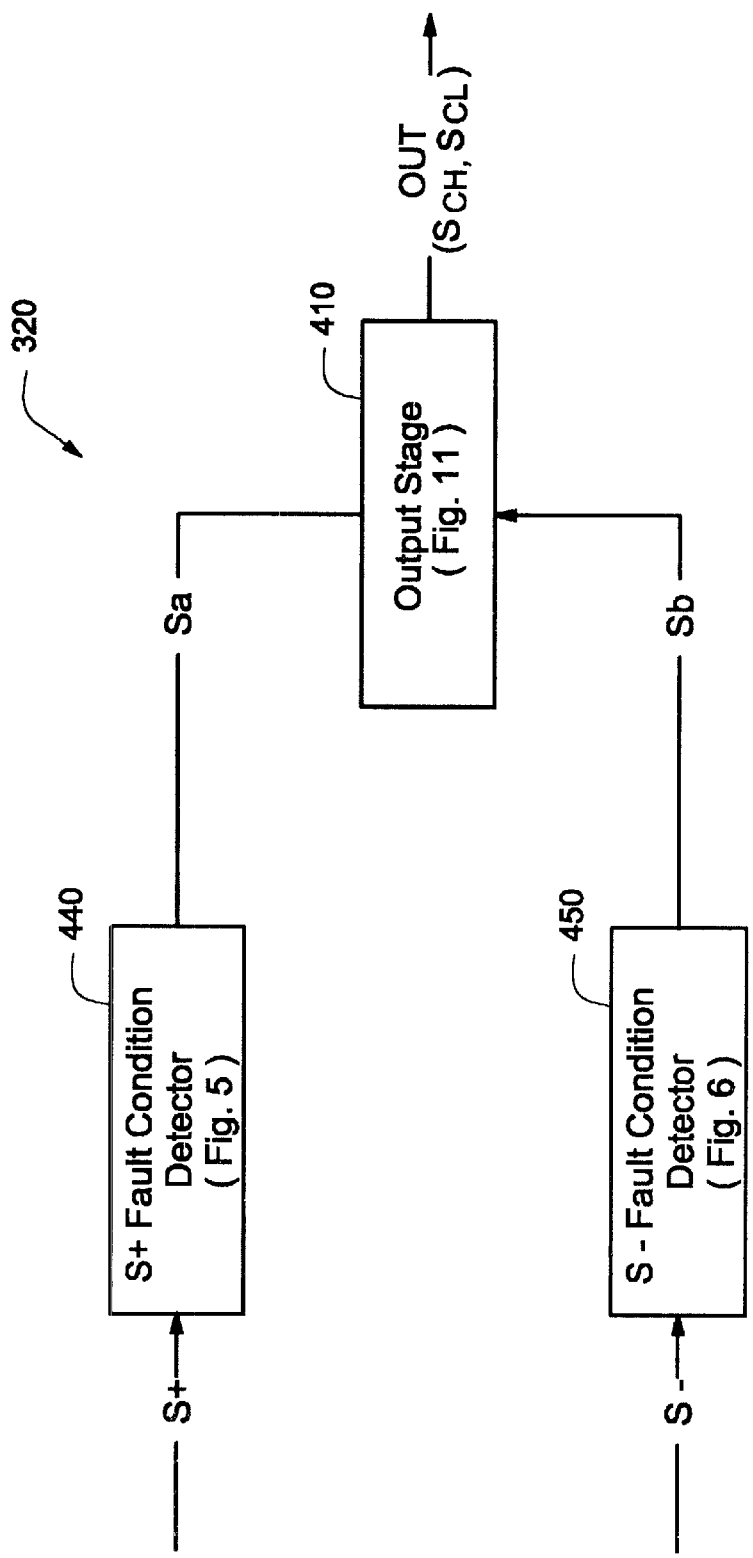
FIG. 4 is a block diagram illustrating the LVDS open circuit fault condition detector processing the high and low differential signals.

FIG. 4 is a block diagram illustrating an exemplary configuration of LVDS open circuit fault condition detector 320 processing the two sides of differential signal IN (S+, S−) (see $S_h$ and $S_l$ at FIG. 2). LVDS open circuit fault condition detector includes a S+ fault condition detector 440, a S− fault condition detector 450, and output stage 410.

S+ fault condition detector 440 has an input coupled to differential signal S+ and an output coupled to output stage 410. S− fault condition detector 450 has an input coupled to differential signal S− and an output coupled to output stage 410. Output stage 410 receives inputs from S+ fault condition detector 440 and from S− fault condition detector 450, and outputs fault condition control signal OUT ($S_{CH}$, $S_{CL}$).

In operation, S+ fault condition detector 440 receives the high side of the differential signal (S+) and outputs comparator signal Sa. S− fault condition detector 440 receives the low side of the differential signal (S−) and outputs comparator signal Sb. Output stage 410 receives comparator signals Sa and Sb and outputs fault condition control signal OUT ($S_{CH}$, $S_{CL}$).

Figure 5:
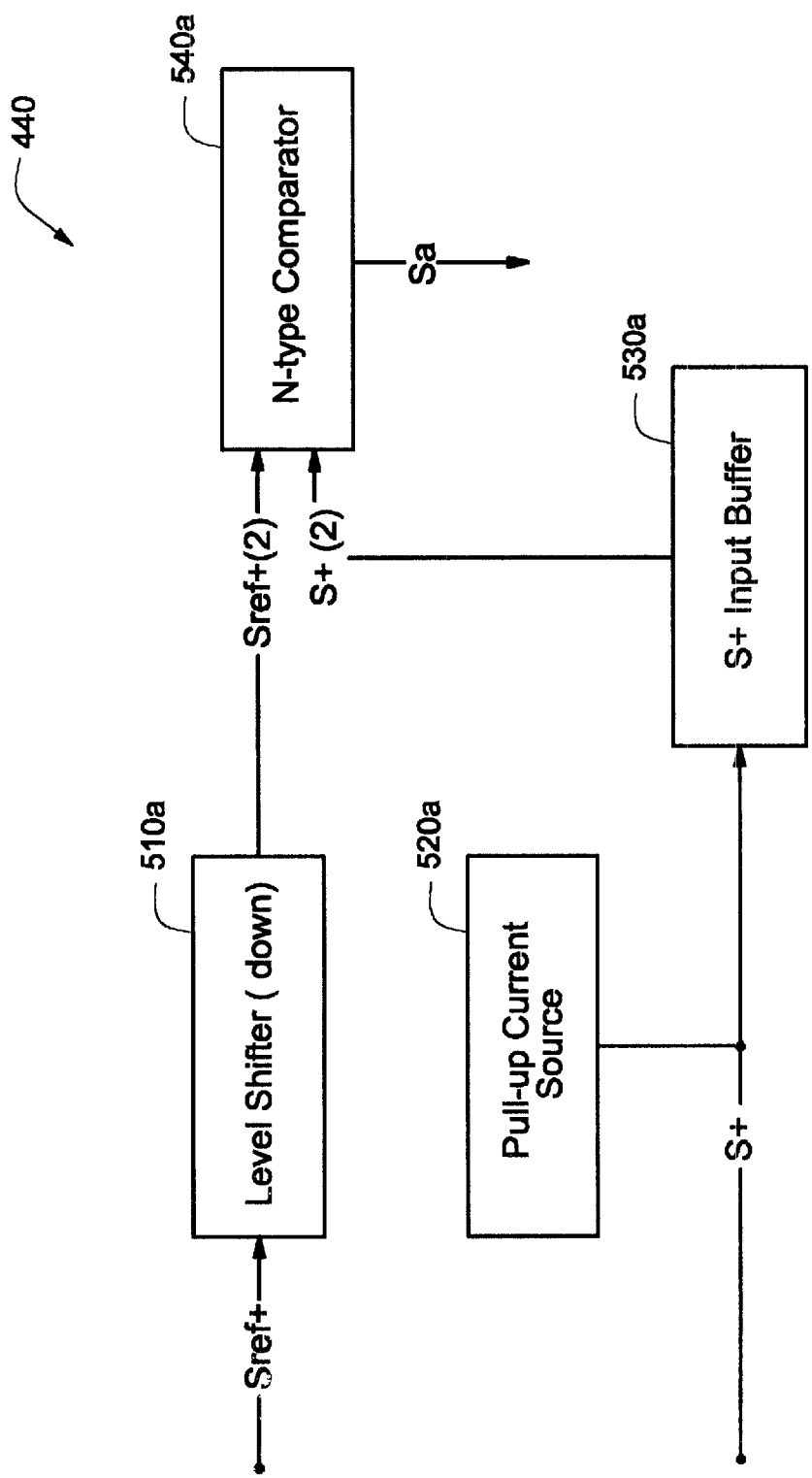
FIG. 5 is a block diagram illustrating the LVDS open circuit fault condition detector processing the high side of a differential signal.
Figure 6:
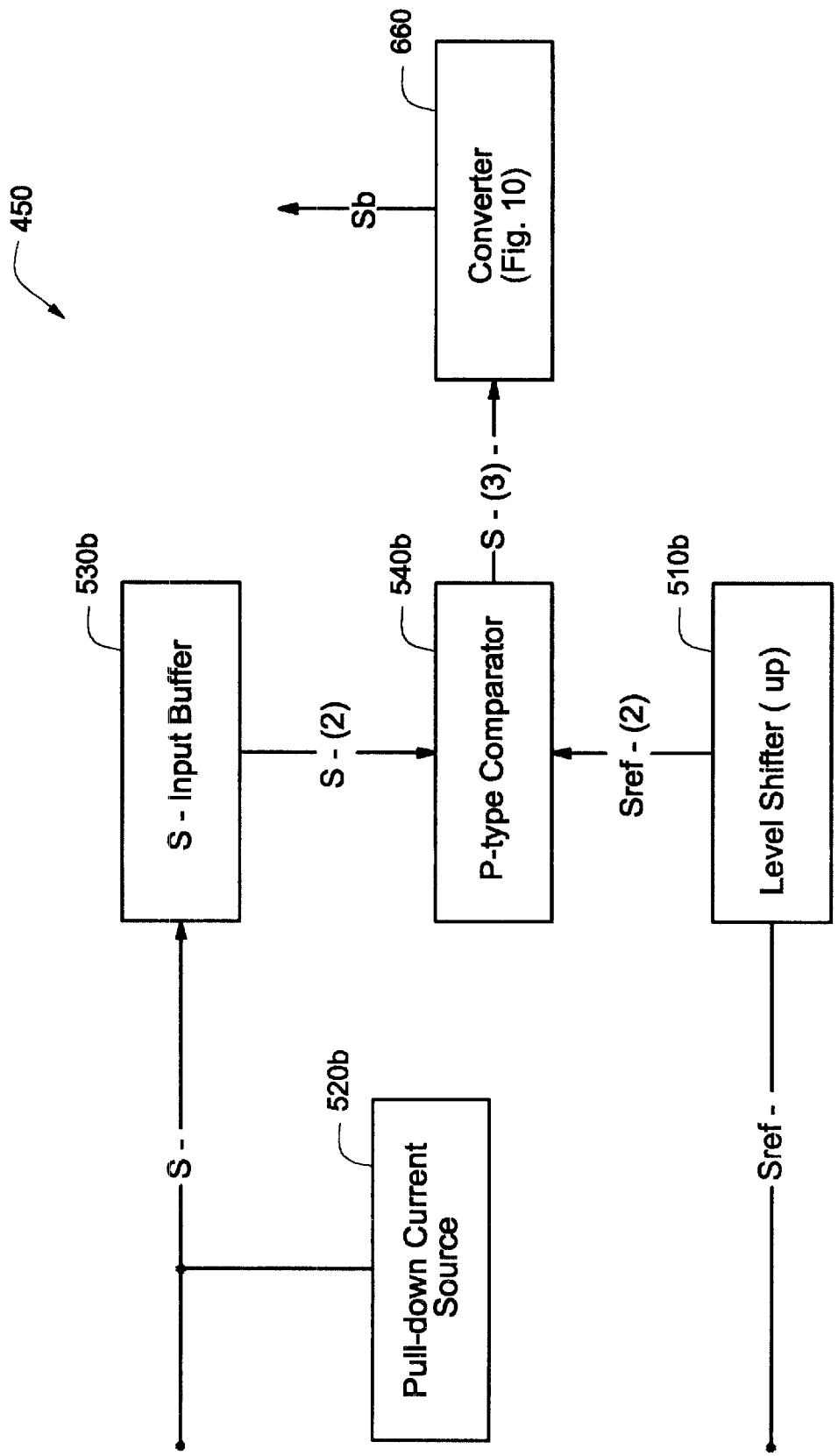
FIG. 6 is a block diagram illustrating the LVDS open circuit fault condition detector processing the low side of a differential signal.

FIGS. 5 and 6 are block diagrams illustrating exemplary configurations of S+ and S− fault condition detectors (440, 450) processing the two sides of the differential signal $S_d$ (S+, S−) (see $S_h$ and $S_l$ at FIG. 2). In FIG. 5, the S+ fault condition detector 440 includes pull-up current source 520a, S+ input buffer 530a, level shifter (down) 510a, and N-type comparator 540a.

Pull-up current source 520a is coupled to signal S+. The input of S+ Input Buffer 530a is coupled to Signal S+ and it outputs signal S+(2). The input of level shifter (down) 510a is coupled to Signal Sref+, and it outputs signal Sref+(2). The inputs of N-type comparator 540a are coupled to signals Sref+(2) and S+(2), and it outputs signal Sa.

In operation, both pull-up current source 520a and S+ input buffer 530a are coupled to signal S+. Pull-up current source 520a is a current source having high impedance, and is arranged to "pull-up" signal S+ toward voltage supply $V_{DD}$ when S+ is weak, as occurs in an open circuit fault. In a normal condition, pull-up current source 520a is not strong enough to load, alter, or disturb signal S+. S+ input buffer 540a has high input impedance and very small input capacitance to minimize disturbing S+. S+ input buffer 540a outputs signal S+(2).

Signals Sref+ and Sref− are predetermined to define the detection range with respect to the valid common-mode voltage and local supply values $V_{DD}$ and $V_{SS}$, respectively, as illustrated in FIG. 2. Level shifter (down) 510a is configured to match the level shift of S+ input buffer 530a, such that Sref+ is shifted down by the same magnitude as S+. Level shifter (down) 510a outputs signal Sref+(2). N-type comparator 540a receives input signals Sref+(2) and S+(2), and outputs comparator signal Sa. The disclosure related to FIG. 8 contains additional details concerning the configuration and operation of S+ fault condition detector 440.

FIG. 6 is a block diagram illustrating an exemplary configuration of a S− fault condition detector 450 processing the S− side of differential signal $S_d$ (S+, S−). The S− fault condition detector includes pull-down current source 520b, S− input buffer 530b, converter 660, level shifter (up) 510b, and P-type comparator 540b.

Signal S− is coupled to pull-down current source 520b and S− input buffer 530b. The output of S− input buffer 530b is coupled to an input of P-type comparator 540b. The input of level shifter (up) 510b is coupled to Signal Sref−, and its output is coupled to an input of P-type comparator 540b. The inputs of P-type comparator 540b are coupled to the outputs of level shifter (up) 510b and the output of S− input buffer 530b, and it outputs signal S−(3). Converter 660 has an input coupled to P-type comparator 540b and outputs signal Sb.

In operation, the S− fault condition detector 450 of FIG. 6 is substantially similar to the S+ fault condition detector 440 of FIG. 5. However, the two detectors use different type channel devices. In an embodiment, the S+ fault condition detector employs n-channel devices and the S− fault condition detector employs p-channel devices. S− fault condition detector 450 additionally includes converter 660 to invert the output of p-type comparator 540b so that comparator signals (Sa, Sb) can be used processed by the same common mode logic as more fully described in FIG. 11.

In operation, both pull-down current source 520b and S− input buffer 530b are coupled to signal S−. Pull-down current source 520b is a current source having high impedance. It is arranged to "pull-down" signal S− toward voltage supply $V_{SS}$ when S− is weak, as occurs in an open circuit fault. In a normal condition, pull-down current source 520b is not strong enough to load, alter, or disturb signal S−. S− input buffer 540b has high input impedance and very small input capacitance to minimize disturbing signal S−. S− input buffer 530b outputs signal S−(2). Level shifter (up) 510b is configured to match the level shift of S− input buffer 530b, such that its output Sref−(2) is shifted up by the same magnitude as S−(2).

Level shifter (up) 510b outputs Sref−(2) maintaining the predetermined detection range with S−(2). P-type comparator 540b receives input signals Sref−(2) and S−(2), and outputs comparator control signal S−(3). The disclosure related to FIG. 9 contains additional detail concerning the configuration of P-type comparator 540b and output control signal S−(3). Converter 660 receives output control signal S−(3) and outputs comparator control signal Sb. The disclosure related to FIG. 10 contains additional detail concerning the configuration and operation of converter 660.

Figure 7:
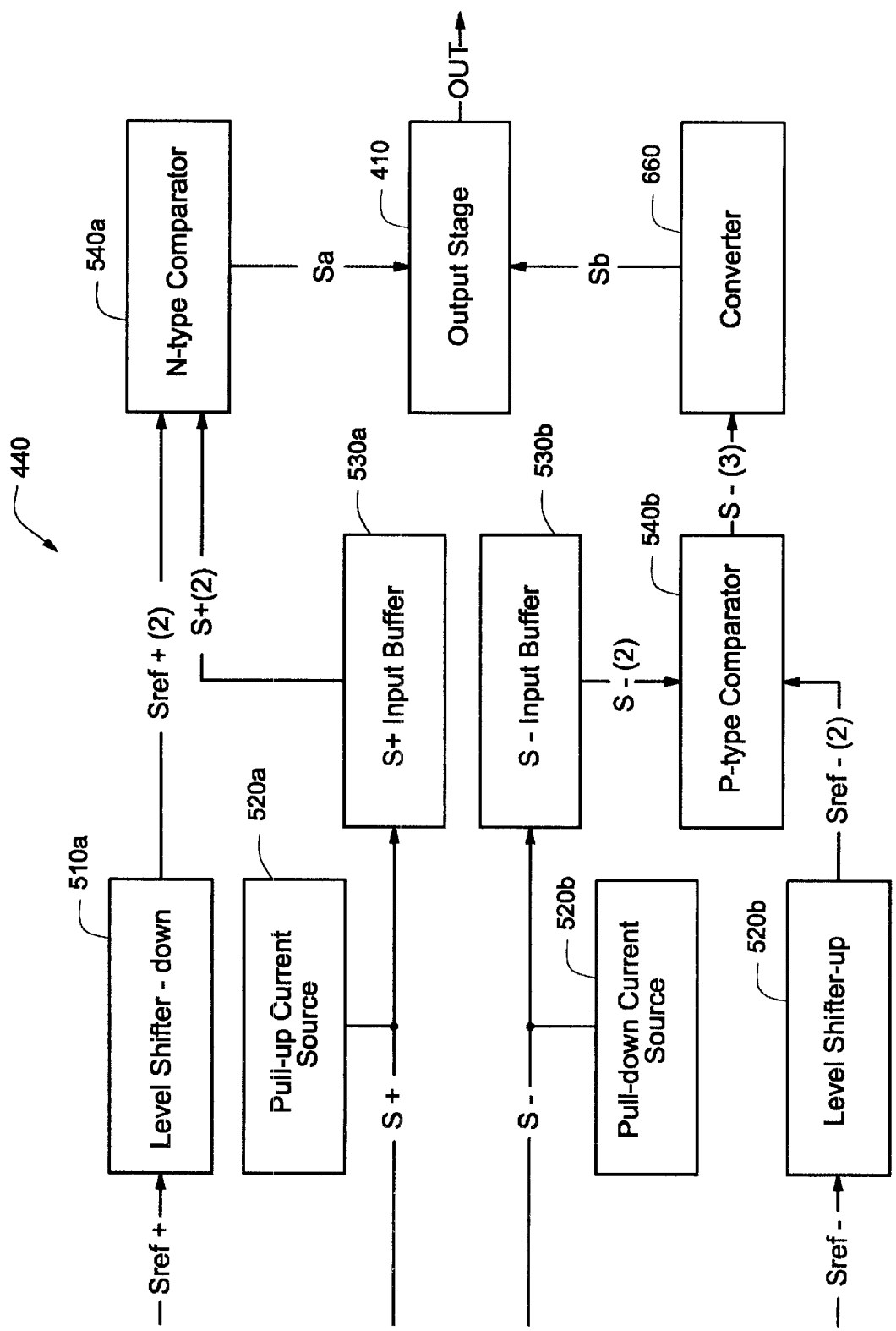
FIG. 7 is a block diagram illustrating an exemplary LVDS open circuit fault condition detector apparatus overview.

FIG. 7 is a block diagram illustrating an exemplary configuration of an embodiment of the invention using components previously disclosed in FIGS. 4–6. The block titles, figure numbers, connections, and operation are the same as in FIGS. 4–6. Another embodiment can exchange n-channel devices for p-channel devices, and employ a converter (660) as is appropriate so that the inputs to output stage 660 are compatible with its logic circuitry.

Figure 8:
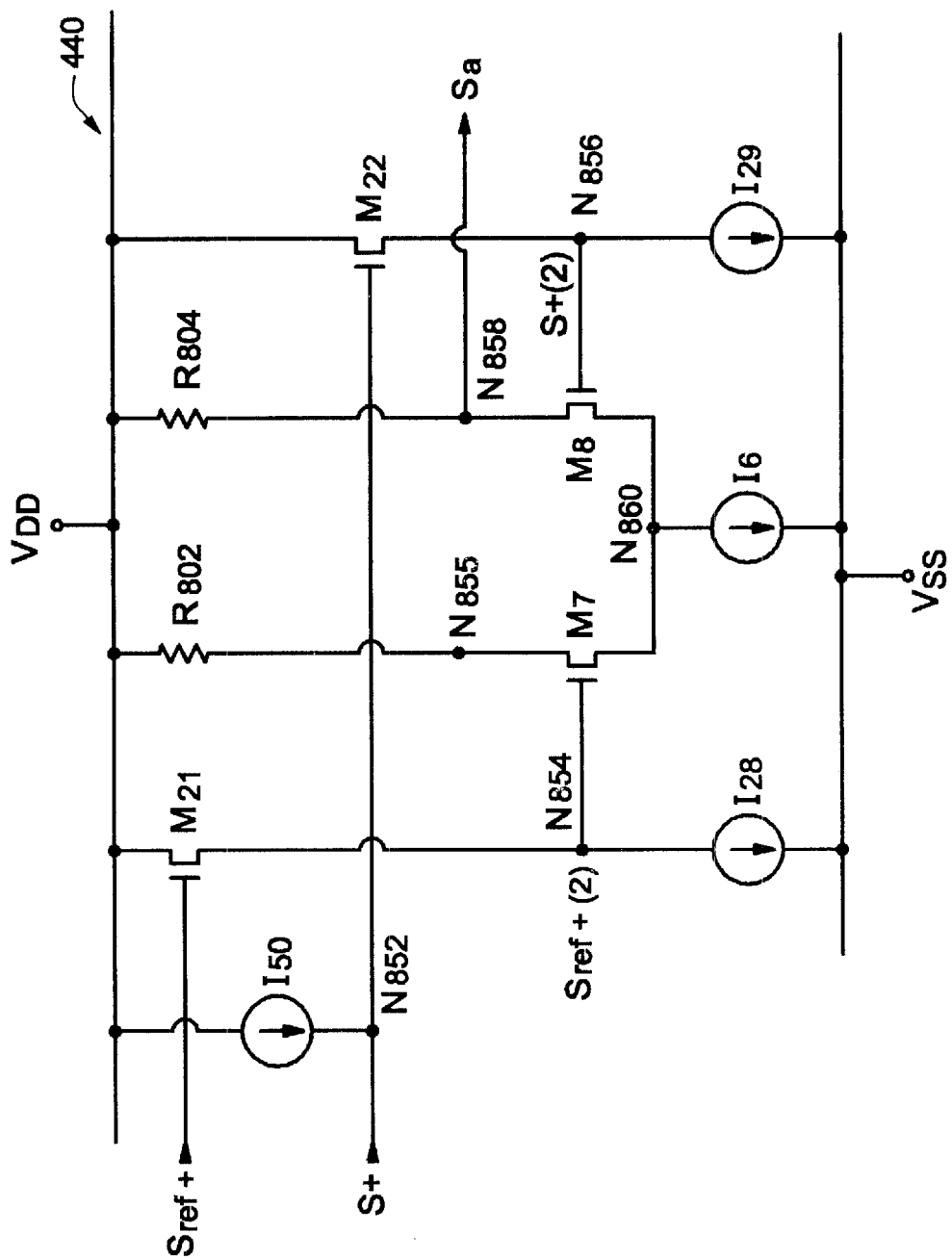
FIG. 8 is a schematic diagram illustrating an exemplary S+ fault condition detector.

FIG. 8 is a schematic diagram of an exemplary S+ fault condition detector 440 according to an embodiment of the invention. As shown, S+ fault condition detector 440 includes n-type transistors $M_7$, $M_8$, $M_{21}$, and $M_{22}$; current sources $I_6$, $I_{20}$, $I_{29}$, and $I_{50}$: and loads $R_{802}$ and $R_{804}$.

Transistor $M_7$ has a base coupled to node N854, a drain coupled to node N855, and a source coupled to node N860. Transistor $M_8$ has a base coupled to node N856, a drain coupled to node N858, and a source coupled to N860. Transistor $M_{21}$ has a base coupled to signal Sref+, a drain coupled to $V_{DD}$, and a source coupled to node N854. Transistor $M_{22}$ has a base coupled to signal S+, a drain coupled to $V_{DD}$, and a source coupled to node N856. Loads $R_{802}$ and $R_{804}$ are coupled between $V_{DD}$ and nodes N855 and N858, respectively. Current sources $I_6$, $I_{20}$, and $I_{29}$ are coupled between nodes N854, N860, and N856, and $V_{SS}$, respectively. Current source $I_{50}$ is coupled between $V_{DD}$ and signal S+.

In operation, transistor $M_{22}$ functions as a source follower, acts as an input buffer isolating LVDS open circuit detector 320 from differential signal S+, and outputs single-sided signal S+(2). Transistor $M_{22}$ is a relatively small device with high impedance and very low capacitance input capacitance in the range of 45–60 fF. As a result, transistor $M_{22}$ does not does not add significant capacitance, or load, alter, or disturb signal S+. Current source $I_{50}$ is a weak, high impedance source that does not significantly load signal S+, and is arranged to "pull-up" signal S+ toward voltage supply $V_{DD}$ when S+ is weak, as occurs in an open circuit fault. A pull-up can occur because a floating or open signal does not have any voltage holding it to any other value. In a normal condition, pull-up current source $I_{50}$ is not strong enough to disturb signal S+. Signal Sref+ is supplied by an external source, and its value is predetermined to provide a detection range between the high signal component $(S_h)$ of the differential signal $(S_d)$ and local power supply $V_{DD}$ (See FIG. 2). For example, signal Sref+ could be set at 2.0 volts when $V_{DD}$ is 2.5 volts and the high signal component $(S_h)$ is 1.7 volts. This provides 300 mV of remaining headroom between a valid differential signal and signal Sref+ for detecting an open circuit fault. Transistors $M_{21}$ and $M_{22}$ are matched, and their current sources $I_{28}$ and $I_{29}$ are also matched. This equalizes the signal shift of S+ and Sref+ and maintains the predetermined detection range. Transistor $M_{22}$ outputs buffered signal S+(2) and transistor $M_{21}$ outputs signal Sref+(2).

Transistors $M_7$ and $M_8$ are a n-type differential pair, and act as a comparator in cooperation with loads $R_{802}$ and $R_{804}$, and current source $I_6$. Single-ended signal S+(2) is applied to the base of transistor $M_8$. Reference signal Sref+(2) is applied to the base of transistor $M_7$. Loads $R_{802}$ and $R_{804}$ are sized to allow approximately equal current flow through transistors $M_7$ and $M_8$ when signal Sref+(2) is substantially equal to signal S+(2). In an open fault condition, transistor $M_8$ has a larger base-to-source voltage than transistor $M_7$ because current source $I_{50}$ is able to pull up single-ended signal S+(2) into the detection range above signal Sref+(2). This causes more current to be steered through transistor $M_8$ and less current to be steered through transistor $M_7$. Signal Sa at node N858 is pulled down toward $V_{SS}$ generating a low comparator signal Sa, representing a possible open circuit fault condition in signal S+.

In a normal condition, transistor $M_8$ has a smaller base-to-source voltage than transistor $M_7$ when single-ended signal S+(2) falls below signal Sref+(2). This causes less current to be steered through transistor $M_8$ and more current to be steered through transistor $M_7$. Signal Sa at node N858 is pulled up toward $V_{DD}$ generating a high comparator signal Sa. Current source $I_{50}$ is not able to pull signal S+(2) up because S+ is tied to the differential signal voltage Sd. High comparator signal Sa represents a normal condition.

Figure 9:
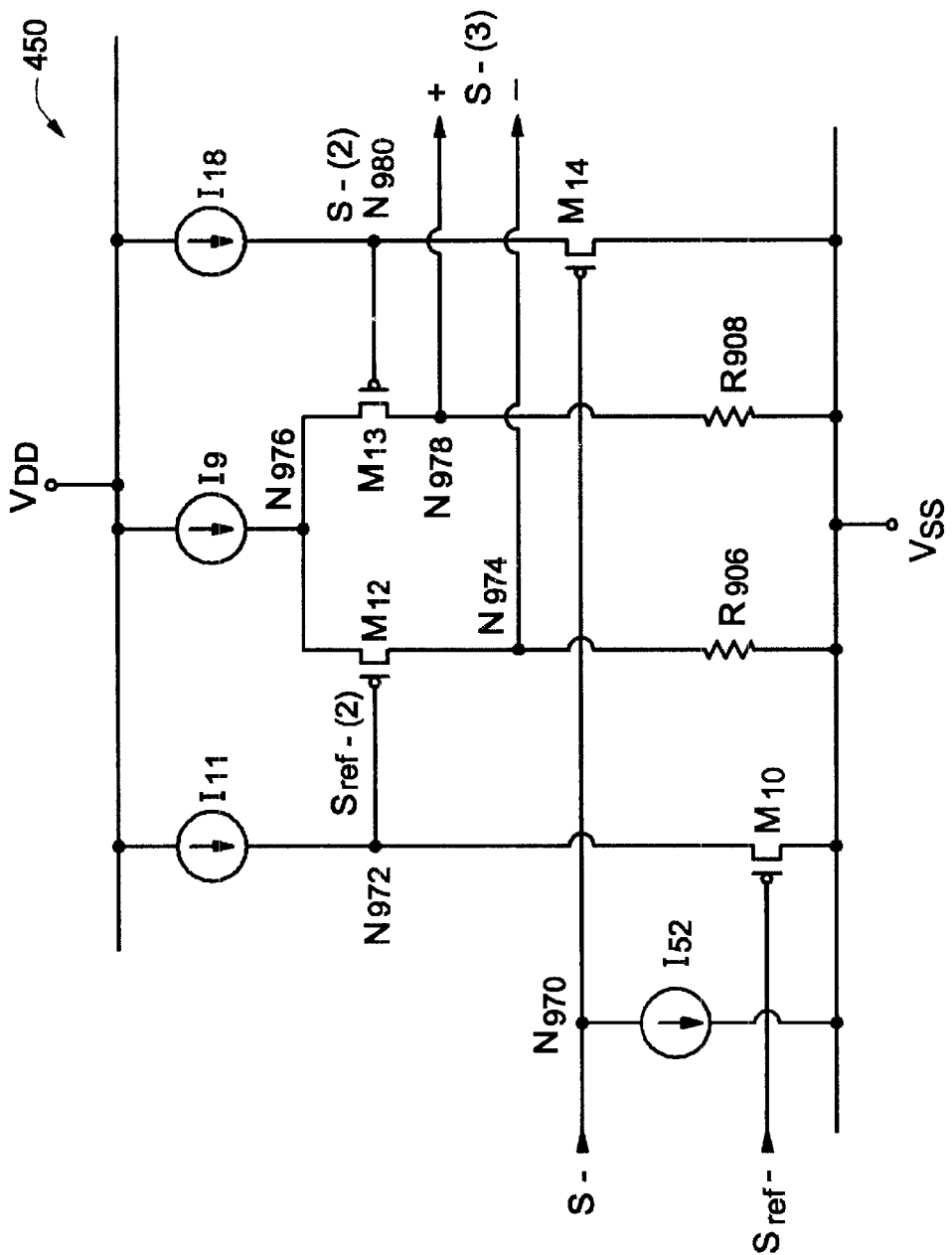
FIG. 9 is a schematic diagram illustrating an exemplary S− fault condition detector.

FIG. 9 is a schematic diagram of an exemplary S− fault condition detector 450 according to an embodiment of the invention. S− fault condition detector 450 employs p-type transistors and functions in substantially the same manner as S+ fault condition detector 440, except that its output must be inverted to operate the current mode logic of output stage 410 (See FIGS. 10 and 11 for converter 660 and output stage 410). As shown, S− fault condition detector 450 includes p-type transistors $M_{10}$, $M_{12}$, $M_{13}$, and $M_{14}$; current sources $I_9$, $I_{10}$, $I_{18}$, and $I_{52}$: and loads $R_{906}$ and $R_{908}$.

Transistor $M_{12}$ has a base coupled to node N972, a drain coupled to node N976, and a source coupled to node N974. Transistor $M_{13}$ has a base coupled to node N980, a drain coupled to node N976, and a source coupled to N978. Transistor $M_{10}$ has a base coupled to signal Sref−, a source coupled to $V_{SS}$, and a drain coupled to node N972. Transistor $M_{14}$ has a base coupled to signal S−, a source coupled to $V_{SS}$, and a drain coupled to node N980. Loads $R_{906}$ and $R_{908}$ are coupled between $V_{SS}$ and nodes N974 and N978, respectively. Current sources $I_9$, $I_{11}$, and $I_{18}$ are coupled between nodes N972, N976, and N980, and $V_{DD}$, respectively. Current source $I_{52}$ is coupled between $V_{SS}$ and signal S−.

In operation, transistor $M_{14}$ functions as a source follower, acts as an input buffer isolating LVDS open circuit detector 320 from differential signal S−, and outputs a differential signal S−(2). Transistor $M_{14}$ is a relatively small device with high impedance and very low capacitance input capacitance in the range of 45–60 fF. As a result, transistor $M_{14}$ does not does not add significant capacitance, or load, alter, or disturb signal S−. Current source $I_{52}$ is a weak, high impedance source arranged in approximately the same manner as current source $I_{50}$. Current source $I_{52}$ does not significantly load signal S−, and is arranged to "pull-down" signal S− toward voltage supply $V_{SS}$ when S− is weak, as occurs in an open circuit fault. A pull-down can occur because a floating or open signal does not have any voltage holding it to any other value. In a normal condition, pull-down current source $I_{52}$ is not strong enough to disturb signal S−. Signal Sref− is supplied externally, and like signal Sref+, its value is predetermined to provide adequate headroom between the low signal component $(S_l)$ of the differential signal $(S_d)$ and local power supply $V_{SS}$ (See FIG. 2). For example, signal Sref− could be set at 0.5 volts when $V_{SS}$ is 0.0 volts and the low signal component $(S_l)$ is 1.3 volts. This provides 800 mV of headroom between the low signal component $(S_l)$ of a valid differential signal and reference signal Sref− for detecting an open circuit fault.

Transistors $M_{10}$ and $M_{14}$ are matched, and their current sources $I_{11}$ and $I_{18}$ are also matched. This equalizes the signal shifts of S+ and Sref+ and maintains the predetermined detection range. Transistor $M_{22}$ outputs buffered signal S+2 and transistor $M_{21}$ outputs signal Sref+(2).

Transistors $M_{12}$ and $M_{13}$ are a p-type differential pair, and function as a comparator in cooperation with loads $R_{906}$ and $R_{908}$ and current source $I_9$. Single-ended signal S−(2) is applied to the base of transistor $M_{13}$. Reference signal Sref−(2) is applied to the base of transistor $M_{10}$. Loads $R_{906}$ and $R_{908}$ are sized to allow approximately equal current flow through transistors $M_{12}$ and $M_{13}$ when signal Sref−(2) is substantially equal to signal S−(2).

In a fault condition, transistor $M_{13}$ has a lower base-to-source voltage than transistor $M_{12}$ because single-ended signal S−(2) has been pulled below signal Sref−(2) by current source $I_{52}$. More current is steered through transistor $M_{13}$ and less current is steered through transistor $M_{12}$. The plus side of signal S−(3) at node N978 is pulled high toward $V_{DD}$, and the minus side of signal S−(3) at node N974 is pulled low toward $V_{SS}$. The resulting high signal S−(3) represents a possible fault condition in signal S−detected by the invention. This signal must be inverted by converter 660, as illustrated in FIG. 10, so that a compatible comparator signal Sb can be generated for use by the common-mode logic of output stage 410 as illustrated in FIG. 11.

In a normal condition, transistor $M_{12}$ has a lower base-to-source voltage than transistor $M_{13}$ because current source $I_{52}$ is not able to pull-down signal S−(2). This causes more current to be steered through transistor $M_{12}$ and less current to be steered through transistor $M_{13}$. As a result, the minus side of signal S−(3) at node N974 is pulled high toward $V_{DD}$, and the plus side of signal S−(3) at node N978 is pulled low toward $V_{SS}$.

Figure 10:
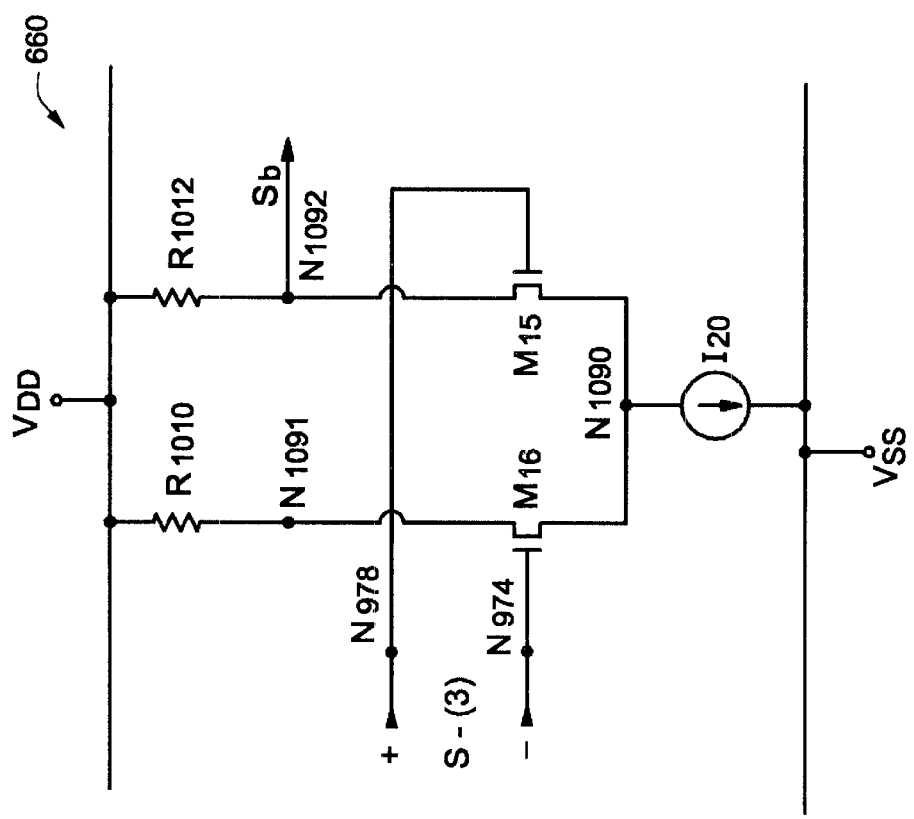
FIG. 10 is a schematic diagram illustrating an exemplary converter.
Figure 11:
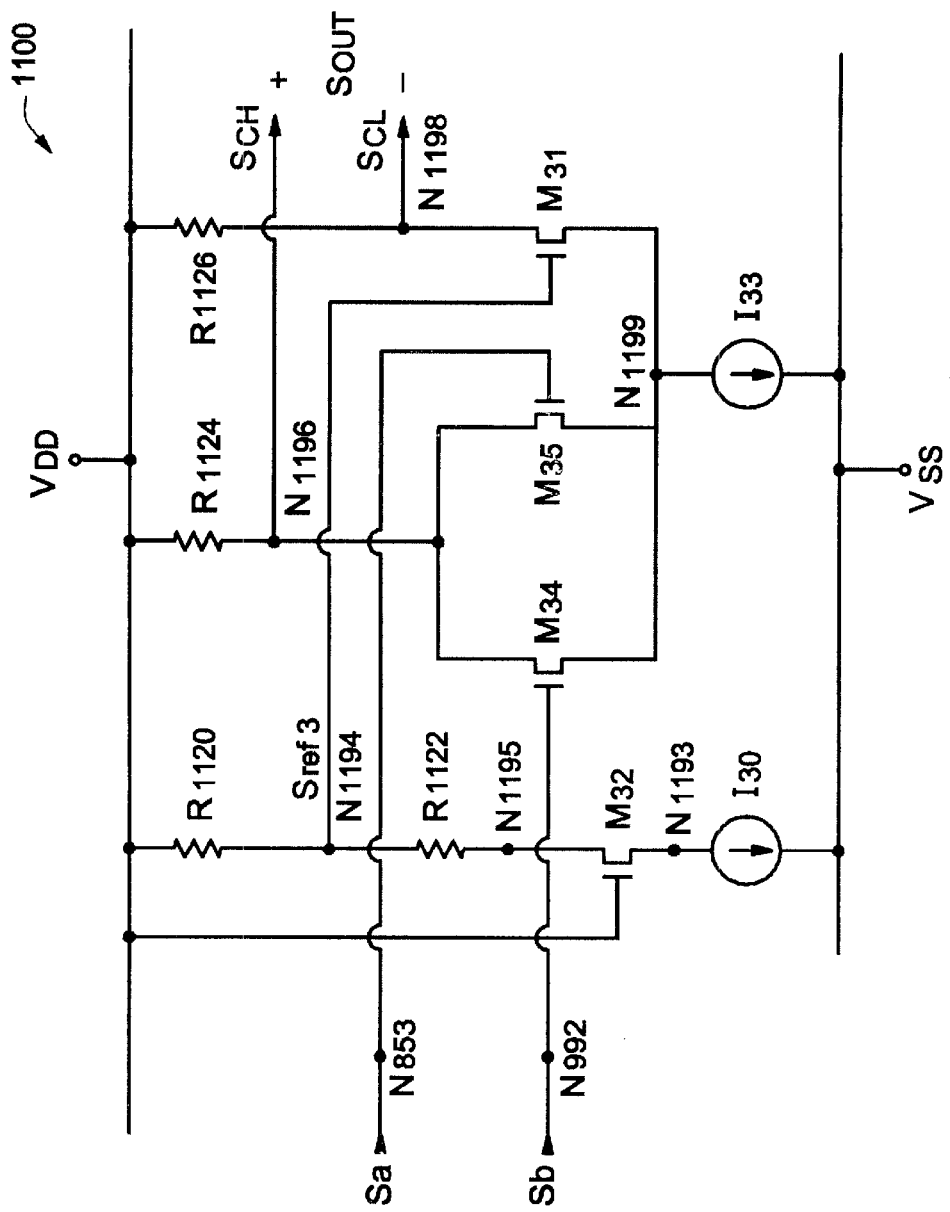
FIG. 11 is a schematic diagram illustrating an exemplary output stage.

FIG. 10 is a schematic diagram of an exemplary converter 660 according to an embodiment of the invention. Converter 660 includes n-type transistors $M_{15}$ and $M_{16}$; current source $I_{20}$: and loads $R_{1010}$ and $R_{1012}$.

Transistor $M_{15}$ has a base coupled to node N978, a drain coupled to node N1092, and a source coupled to node N1090. Transistor $M_{16}$ has a base coupled to node N974, a drain coupled to node N1091, and a source coupled to node N1090. Loads $R_{1010}$ and $R_{1012}$ are coupled between $V_{DD}$ and nodes N1091 and N1092 respectively. Current source $I_{20}$ is coupled between node N1090 and $V_{SS}$.

In operation, converter 660 inverts Signal S–(3). The high and low sides of signal S–(3) are applied to the bases of differential pair transistors $M_{15}$ and $M_{16}$ respectively. Loads $R_{1010}$ and $R_{1012}$ are sized to allow approximately equal current flow through transistors $M_{15}$ and $M_{16}$ when the high and low sides of signal S–(3) are substantially equal. In the normal condition when the high side of signal S–(3) rises above the low side of signal S–(3), transistor $M_{15}$ has a larger base-to-source voltage than transistor $M_{16}$, causing $M_{15}$ to drive more current than transistor $M_{16}$. The greater current through $M_{15}$ and load $R_{1012}$ pulls signal Sb higher, and drives node N1091 lower. In a fault condition when the low side of signal S–(3) rises above the high side of signal S–(3), transistor $M_{16}$ has a larger base-to-source voltage than transistor $M_{15}$, causing $M_{16}$ to drive more current than transistor $M_{15}$. The greater current through $M_{16}$ and load $R_{1010}$ pulls signal Sb lower, and drives node N1091 higher. Converter 660 has inverted high signal S–(3) (fault condition) into a low comparator signal Sb. Likewise, a low signal S–(3) (normal condition) is inverted into a high signal Sb.

FIG. 11 illustrates a schematic diagram of an exemplary output stage 1100 according to an embodiment of the invention, and is an embodiment of output stage 410 as shown in FIG. 4. Output stage 1100 includes transistors $M_{31}$, $M_{32}$, $M_{34}$, and $M_{35}$; loads $R_{1120}$, $R_{1122}$, $R_{1124}$, and $R_{1126}$; and current sources $I_{30}$ and $I_{32}$.

Transistor $M_{31}$ has a base coupled to node N1194, a drain coupled to node N1198, and a source coupled to node N1199. Transistor $M_{32}$ has a base coupled to $V_{DD}$, a drain coupled to node N1195, and a source coupled to node N1193. Transistor $M_{35}$ has a base coupled to node N858, a drain coupled to node N1196, and a source coupled to node N1199. Transistor $M_{34}$ has a base coupled to node N992, a drain coupled to node N1196, and a source coupled to node N1199. Current source $I_{30}$ is coupled between node N1193 and local power supply $V_{SS}$. Current source $I_{33}$ is coupled between node N1199 and local power supply $V_{SS}$. Loads $R_{1120}$, $R_{1124}$ and $R_{1126}$ are coupled between local power supply $V_{DD}$ and nodes N1194, N1196, and N1198, respectively. Load $R_{1122}$ is coupled between nodes N1194 and 1195.

In operation, output stage 1100 is similar to a wired current-mode logic (CML) NOR gate, or a three output comparator. Output stage 1100 includes a reference signal generator (Sref3). Signal Sref3 is provided by loads $R_{1120}$ and $R_{1122}$, transistor $M_{32}$, and current source $I_{30}$. Transistor $M_{32}$ has a base biased at $V_{DD}$, and functions as a voltage-controlled resistor. Transistor $M_{32}$ in conjunction with loads $R_{1120}$ and $R_{1122}$, and current source $I_{30}$ forms a controlled voltage drop from local power supply $V_{DD}$ to $V_{SS}$, and outputs signal Sref3 at node N1194. The logic-type functionality resides in a differential pair formed by transistor $M_{31}$ and the parallel pair of transistors $M_{34}$ and $M_{35}$. Loads $R_{1124}$ and $R_{1126}$ are approximately equal and function as pull-up devices for nodes N1196 and N1198, respectively. Current source $I_{33}$ provides a constant current source at node N1199, which is coupled to the sources of transistors $M_{34}$, $M_{35}$, and $M_{31}$. Signal Sref3 provides a uniform base-to-source bias voltage for transistor $M_{31}$. The current through transistor $M_{31}$ establishes the level of signal $S_{CL}$ at node N1198. Transistor $M_{31}$ is always enabled by Sref3 coupled to its base.

Comparator signals Sa and Sb are coupled to the bases of differential pair transistors $M_{35}$ and $M_{34}$ respectively. As illustrated in the preceding figures, at least one high comparator signal (Sa, Sb) represents a normal condition, and two low comparator signals (Sa, Sb) represent a fault condition. In a normal condition, at least one single-ended signal is not pulled into a detection range, resulting in at least one high comparator signal (Sa, Sb) being generated. In a fault condition, both single-ended signals are pulled into their respective detection ranges, and both comparator signals (Sa, Sb) are low. As a result, in normal LVDS condition, at least one comparator signal (Sa, Sb) is high at the bases of transistor $M_{34}$ or $M_{35}$, respectively. This results in at least one of transistors $M_{34}$ or $M_{35}$ being on and steering current away from transistor $M_{31}$. As a result, the current through load $R_{1126}$ decreases, and fault condition control signal $S_{CL}$ is pulled high toward $V_{DD}$. The current through load $R_{1124}$ increases, and fault condition control signal $S_{CH}$ is pulled low toward $V_{SS}$. Transistors $M_{34}$ and $M_{35}$ are sized so that the current steering results in $S_{CH}$ being lower than $S_{CL}$, indicating a normal LVDS condition. In a LVDS fault condition, both comparator signals (Sa, Sb) are low at the bases of transistors $M_{34}$ and $M_{35}$. Both transistors $M_{34}$ and $M_{35}$ are turned off, current $I_{33}$ flows entirely through transistor $M_{31}$. As a result, the current through load $R_{1198}$ increases, and fault condition control signal $S_{CL}$ is pulled low toward $V_{SS}$. The current through load $R_{1196}$ decreases, and fault condition control signal $S_{CH}$ is pulled high toward $V_{DD}$. Components $M_{34}$, $M_{35}$, $M_{31}$, $R_{1124}$, $R_{1126}$, and $I_{33}$ are sized so that fault detection signal $S_{CH}$ is greater than $S_{CL}$ when Sa and Sb are low, constituting a fault detection signal. In an embodiment, the transistors are scaled with respect to each other such that transistors $M_{35}$ and $M_{31}$ are twice the capacity of $M_{34}$ (i.e., $((W/L)_{35}=(W/L)_{31}=2\times(W/L)_{34})$.

The components of output circuit 900 are arranged so that the difference between signal $S_{CH}$ and signal $S_{CL}$ is approximately 600 mV. In a normal condition (non-fault condition), output stage 1100 provides a fault condition control signal such that $S_{CL}$ is greater than $S_{CH}$ by approximately 600 mV. In a fault condition, LVDS fault condition detector 320 provides a fault condition control signal such that $S_{CH}$ is greater than $S_{CL}$ by approximately 600 mV.

The high fault condition control signal ($S_{CH} > S_{CL}$) constitutes a fault detection signal and is used by a reporting device to report an open circuit fault. In another embodiment, the fault detection signal is available for other devices such as a digital indicator to communicate the existence of an open circuit fault. See FIG. 3 for an illustration.

Embodiments of output stage 1100 can include many types of wired NOR gates, or three input comparators, to generate fault condition control signals $S_{CH}$ and $S_{CL}$.

Figure 12:
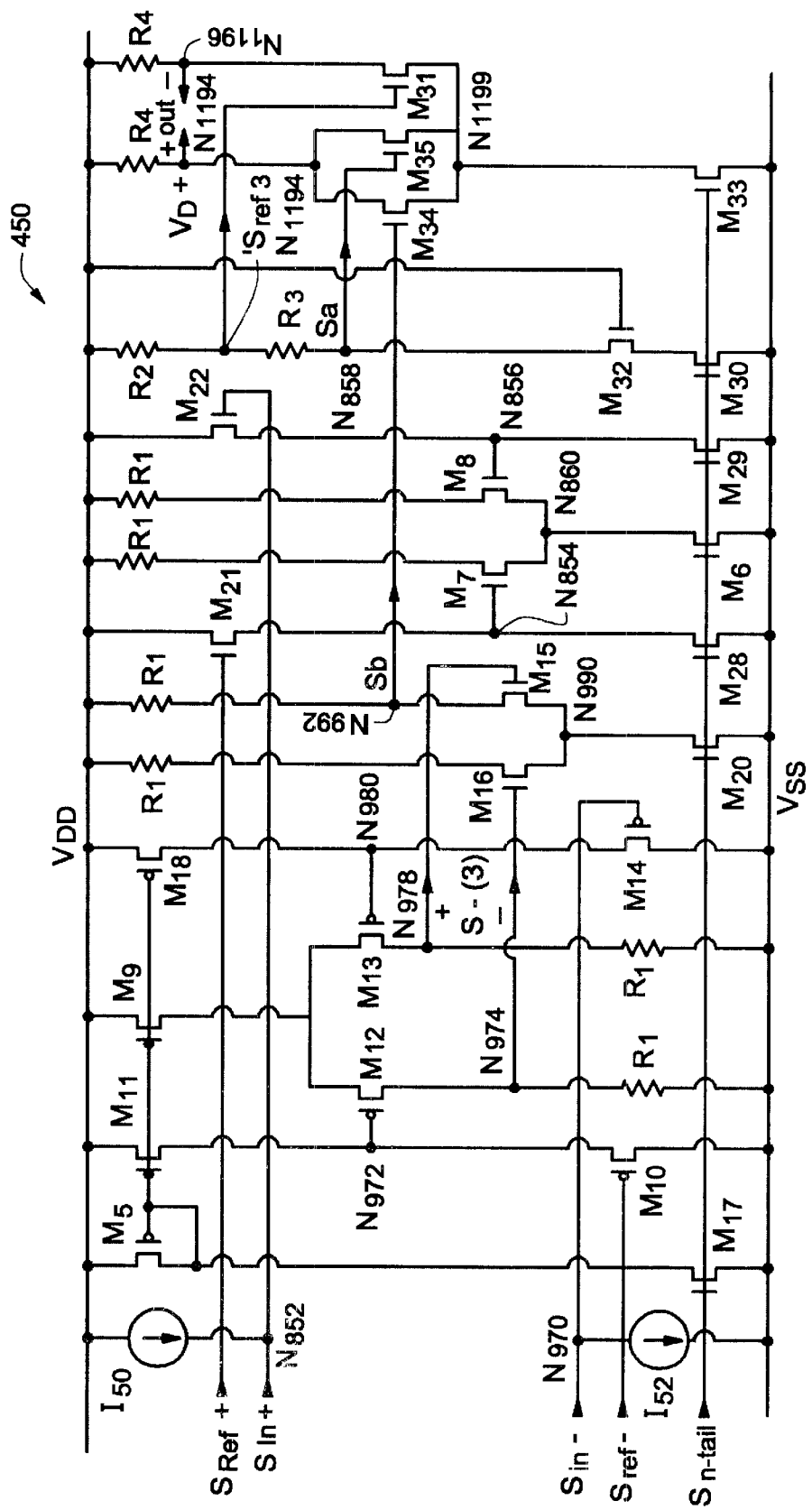
FIG. 12 is a schematic diagram illustrating an exemplary embodiment of the invention.

FIG. 12 illustrates a schematic diagram of a LVDS open circuit fault condition detector 1100 according to an embodiment of the invention, and combines the embodiments illustrated in FIGS. 4–11 into one circuit. FIG. 11 also illustrates an embodiment of LVDS open circuit fault condition detector 320 illustrated in the block diagram of FIG. 3. FIG. 11 also schematically illustrates an open circuit fault condition detector processing both the $S_{ih}$ and $S_{il}$ sides of a LVDS differential signal. Similar components are similarly labeled.

LVDS open circuit fault condition detector 1000 comprises S+ fault condition detector 440 illustrated in FIG. 8, S– fault condition detector 640 illustrated in FIG. 9, converter 660 illustrated in FIG. 10, and output stage 1100 illustrated in FIG. 11. These components of LVDS open circuit fault condition detector are coupled at the nodes described in the figures relating to the particular components, and function as described in FIGS. 8–11. The part numbers are the same as in FIGS. 8–11 except the loads, where like numbers indicate approximately equal values.

Transistors pairs $M_{22}$ and $M_{29}$ are matched to transistors pairs $M_{21}$ and $M_{28}$ on the S+ side. Transistors pairs $M_{10}$ and $M_{11}$ are matched to transistors pairs $M_{14}$ and $M_{18}$ on the S– side. This matching balances the current flow and level shift occurring on each side of signal IN.

The operation of LVDS open circuit fault condition detector is described in conjunction with FIGS. 3–10.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for detecting an open fault condition in differential line that is arranged to carry a differential signal, the apparatus comprising:
    a first current source that is coupled to a first portion of the differential line, and arranged to operate as a weak pull-up such that a potential associated with a first portion of the differential line is drawn towards a first predetermined amplitude level when the differential line is in an open fault condition;
    a second current source that is coupled to a second portion of the differential signal, and arranged to operate as a weak pull-down such that another potential associated with a second portion of the differential line is drawn towards a second predetermined amplitude level when the differential line is in an open fault condition;
    an input buffer circuit that is coupled to the differential line, and arranged to produce a first buffered signal and a second buffered signal in response to the differential signal;
    a first comparator circuit that is arranged to produce a first comparator signal in response to a first comparison between the first buffered signal and a first reference signal;
    a second comparator circuit that is arranged to produce a second comparator signal in response to a second comparison between the second buffered signal and a second reference signal; and
    an output circuit that is arranged to produce an open circuit fault detection signal in response to the first and second comparator signals such that the open fault detection signal indicates that the differential line is in the open fault condition when the first and second portions of the differential signal are outside the valid common-mode range, wherein the input buffer circuit includes a source follower circuit that is arranged to buffer the differential signal such that the differential line is unaffected by loading effects and differential signal is unaltered and undisturbed.

2. The apparatus of claim 1, wherein a potential associated with the first reference signal is less than another potential associated with a power supply line by a predetermined level.

3. The apparatus of claim 1, wherein a potential associated with the second reference signal is greater than another potential associated with a power supply line by a predetermined level.

4. The apparatus of claim 1, wherein the output circuit is arranged to produce the open circuit fault detection signal when the first comparator signal indicates that the first buffered signal exceeds the first reference signals, and the second comparator signal indicates that the second reference signal exceeds the second buffered signal.

5. A method for detecting an open fault condition in a differential line, wherein the differential line includes a first line having a first potential and a second line having a second potential, the method comprising:
    pulling the first line towards a first predetermined potential when the differential line is in the open fault condition;
    pulling the second line towards a second predetermined potential when the differential line is in the open fault condition;
    buffering the first potential to produce a first buffered signal;
    buffering the second potential to produce a second buffered signal;
    comparing the first buffered signal to a first predetermined level to produce a first comparison signal;
    comparing the second buffered signal to a second predetermined level to produce a second comparison signal; and
    producing an open fault detection signal in response to the first comparison signal and the second comparison signal such that the open fault detection signal indicates that the differential line is in the open fault condition when the first and second portions of the differential signal are outside the valid common-mode range, wherein buffering the first potential includes buffering the differential signal such that the differential line is unaffected by loading effects and differential signal is unaltered and undisturbed.

6. The method of claim 5, wherein the first predetermined criteria corresponds to the first buffered signal being greater than a predetermined signal level.

7. A method as in claim 5, wherein the second predetermined criteria corresponds to the second buffered signal being less than a predetermined signal level.

8. The method of claim 5, wherein the first signal portion is pulled toward a first amplitude level.

9. The method of claim 5, wherein the second signal portion is pulled toward a second amplitude level.

10. The method of claim 5, wherein producing an open circuit fault detection signal occurs when the first comparison signal indicates that the first buffered signal exceeds the first predetermined level, and the second comparison signal indicates that the second predetermined signal exceeds the second buffered signal.

11. An apparatus for detecting an open fault condition in differential line that is arranged to carry a differential signal, the apparatus comprising:
    a first pulling means coupled to a first portion of the differential line, and arranged to operate as a weak pull-up such that a potential associated with the first portion of the differential line is drawn towards a first predetermined amplitude level when the differential line is in the open fault condition;
    a second pulling means coupled to a second portion of the differential line, and arranged to operate as a weak pull-up such that another potential associated with the second portion of the differential line is drawn towards a second predetermined amplitude level when the differential line is in the open fault condition;

an input buffering means coupled to the differential line, and arranged to produce a first buffered signal and a second buffered signal in response the differential signal;

a first comparator means that is arranged to produce a first comparator signal in response to a first comparison between the first buffered signal and a first reference signal;

a second comparator means that is arranged to produce a second comparator signal in response to a second comparison between the second buffered signal and a second reference signal; and an output means that is arranged to produce an open circuit fault detection signal in response to the first and second comparator signals such that the open fault detection signal indicates that the differential line is in the open fault condition when the first and second portions of the differential signal are outside the valid common-mode range, wherein the input buffering means is further arranged to buffer the differential signal such that the differential line is unaffected by loading effects and differential signal is unaltered and undisturbed.

* * * * *

UNITED STATES PATENT AND TRADEMARK OFFICE
CERTIFICATE OF CORRECTION

PATENT NO.    : 6,563,322 B1
DATED         : May 13, 2003
INVENTOR(S)   : Douglas Michael Hannan It is certified that error appears in the above-identified patent and that said Letters Patent is hereby corrected as shown below:

<u>Column 7,</u>
Line 55, "$I_{10}$" should read -- $I_{11}$ --

Signed and Sealed this

Twelfth Day of August, 2003

JAMES E. ROGAN
*Director of the United States Patent and Trademark Office*